INVENTORS
MICHAEL C. CHERVENAK
BY RONALD H. WOLK

United States Patent Office 3,539,499
Patented Nov. 10, 1970

3,539,499
PROCESS AND APPARATUS FOR HYDROGEN DEENTRAINING
Michael C. Chervenak, Pennington, and Ronald H. Wolk, Lawrence Township, Mercer County, N.J., assignors to Hydrocarbon Research, Inc., New York, N.Y., a corporation of New Jersey
Filed Aug. 1, 1967, Ser. No. 657,638
Int. Cl. B01j 9/08; C10g 23/06
U.S. Cl. 208—143          5 Claims

ABSTRACT OF THE DISCLOSURE

Use of vertical baffles above the dense catalyst phase in an ebullated bed hydrogenation reactor to minimize the entrainment of undissolved hydrogen and entrained gases in the liquid product.

BACKGROUND OF THE INVENTION

Field of the invention

This invention pertains to the field of catalytic refining, desulfurization and purification of petroleum oils and residuum in a reactor utilizing the ebullated bed technique. It is, of course, applicable to hydrogenation of any material which can be reacted via the ebullated technique.

Description of the prior art

It is customary in ebullated bed hydrogenation reaction. as disclosed by Johanson, Re. 25,770, to use hydrogen amounts in excess of the stoichiometric amount required to accomplish the desired degree of refining. In such a system, when the vaporous products are removed from the reactor separately from the liquid products, a large amount of unreacted hydrogen is retained in the liquid effluent, both in the dissolved state and in the undissolved state in the form of entrained bubbles.

The formation of the entrained gas is primarily due to a cavitator type of action resulting from the high velocity of the gas through the reactor. In the ebullated bed processes which are currently in use, the trapped, undissolved hydrogen in the liquid effluent is either totally lost, or recovered only by flashing at pressures lower than the reactor pressure. The two normal modes of apparatus now being used are:

(a) Removal of the liquid effluent from the reactor at a pressure of about 1000–10,000 p.s.i.g. through a reduction valve and into a separator at a pressure in the order of 50 p.s.i.g. The entrained and volatile dissolved gases are immediately released from the liquid. These gases are then flared. The purity of the hydrogen contained in this vapor is so poor as to negate the economics of recycling to the reactor. This, of course, has the major disadvantage of loss of all entrained and dissolved hydrogen which is costly.

(b) Removal of the liquid effluent to a separate drum at an intermediate pressure between that of the reactor and atmospheric and flashing the liquid. This has the advantage over the above process of separating essentially all of the entrained hydrogen, and possibly some of the dissolved hydrogen from the liquid. The vapor separated would contain, in addition to hydrogen, a quantity of the more volatile organics. These separated gases are then recycled to the reactor.

These are three major problems which are present in this system however:

Large separator size (the separator must be large enough to accommodate not only the dissolved, but also the entrained gases).

Additional flashing steps necessary for complete removal of dissolved gases.

Recompression required before recycle.

The pressure of the recovered hydrogen is lower than the required reaction conditions and thus the hydrogen effluent must be recompressed prior to recycle. This recompression is quite expensive.

SUMMARY OF THE INVENTION

This invention describes the use of vertical baffle plates situated in the liquid portion, i.e., the catalyst density phase of an ebullated catalytic bed hydrogenation reactor to free entrained gases including hydrogen from the liquid product prior to its being removed from the reactor.

In this type reactor, the reaction usually takes place in the presence of a particulate catalytic agent wherein the liquid and gas upflow is such that the bed is expanded and such that the particles are all in a random motion in the liquid. In such condition, they are described as ebullated in the said Johanson patent. In such an ebullated reactor, the catalyst is retained in the reaction zone and thus an interface is formed above which there is no catalyst or a phase of low catalyst density and below which there is a phase of high catalyst density.

We have unexpectedly found that by the use of such baffles, a significant saving can be realized as a result of the increased hydrogen recovery. The baffles apparently act in two ways to inhibit the entrainment caused by the high degree of mechanical mixing present in the liquid. First, by preventing increased dispersion of the hydrogen through the liquid and second, by providing increased surface area in the reactor to allow coalescence of the gas bubbles.

In the case of a hydrogenation process where the entire liquid effluent is depressurized from normal reaction pressures to approximately 40–50 p.s.i.g., all of the vapor product from the depressurization is lost. Since it is normally flared, we have found that with the use of baffles in such a system, we can recover between 15 to 50 percent of the hydrogen that would ordinarily be lost. The hydrogen recovered is separated by the baffles and removed directly from the reactor without depressurization. It is thus immediately available for recycle with only slight recompression.

If flashing of the liquid effluent at intermediate pressures is incorporated in the process, the use of baffles in the reactor still provide several significant advantages. As mentioned heretofore, the hydrogen recovered from the separator must be compressed. The baffles increase the amount of hydrogen recovered at reaction pressures and such hydrogen may be recycled without extensive recompression. Use of the baffles thus result in an overall decrease in cost of using recycled hydrogen.

The baffles also increase the efficiency of each of the intermediate flashing stages with respect to recovery of dissolved hydrogen.

In such a separation, the liquid and vapors are normally in a state of dynamic equilibrium, i.e., fresh liquid containing both entrained and dissolved hydrogen is continuously being introduced to the separator and vapors are being removed at a rate so as to maintain a given gas pressure above the liquid. As vapors, composed mostly of hydrogen gas, are removed from the separator, a pressure differential is created which acts as a driving force to volatilize more hydrogen from the liquid. The greater this differential, the greater the driving force and thus the more hydrogen that will be removed from the liquid. The hydrogen leaving the liquid can arise from two sources; that which is entrained and that which is dissolved. Since the entrained hydrogen is already in the gaseous state, it is the most easily removed from the liquid and comes off first. The deentrainment of this hydrogen has the effect of decreasing the pressure differential. The dissolved hydrogen begins to volatilize only after most, if not all, of the entrained gas has escaped from the liquid, and only that amount of hydrogen will come off that is required to negate the pressure differential.

Therefore, the amount of dissolved hydrogen that can be removed at a given pressure in a separation is dependent on the amount of hydrogen vapor in the separator which results from release of entrained gases. Our invention, by minimizing the entrained hydrogen content of the liquid going into the separator, causes a significant increase in the efficiency of the dissolved hydrogen removed. This means that less flash stages are required for economic removal of the dissolved hydrogen.

A third advantage of our invention is that the separator size can be decreased and thus a significant savings can be realized in equipment requirements.

DESCRIPTION OF THE PREFERRED EMBODIMENT

Figure 1:
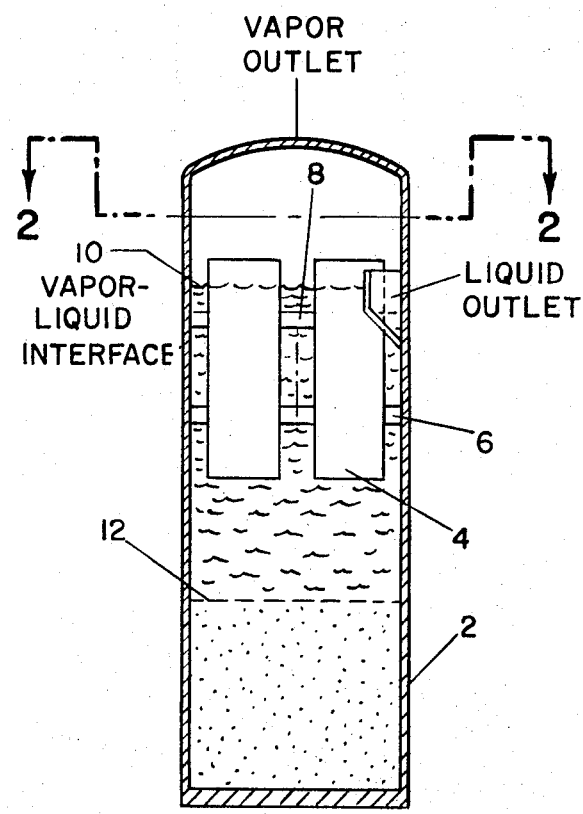
FIG. 1 is a partial vertical cross section of a reactor containing baffles.

FIG. 1 illustrates a multiple baffle arrangement in a typical ebullated bed reactor 2 having a baffle system consisting of one or more baffles 4 which are secured by suitable ligaments 6 to the wall of the reactor and by ligaments 8 to each other. There are, of course, many possible methods of affixing the baffles in the reactor which, however, are not pertinent to the effectiveness of the baffles.

The baffles are preferably symmetrically arranged and located within the reactor and so that the maximum longitudinal axis of each of the baffles is about parallel with the vertical axis of the reaction vessel.

The top edge of the baffles should be slightly above the vapor liquid interface 10, so as to prevent the mixing of gas and liquid in an unbaffled zone. We have found that this positioning gives most efficient deentrainment of hydrogen.

The baffles 4 are preferably rectangular sheets of a suitable metal or a material able to withstand hydrocarbon hydrogenation conditions with a minimum vertical length of about at least 0.3 the reaction vessel diameter and a maximum horizontal (average) width of not greater than 0.4 of the reaction vessel diameter. However, the baffles may be triangular, trapezoidal, or circular wherein they would have at least two sides of large surface area and at least one side of small surface area, and the surface may be corrugated or modified so as to increase the contact surface area with respect to the perimetrical dimensions. Nevertheless, the flat rectangular baffles have proven to be most satisfactory.

Figure 2:
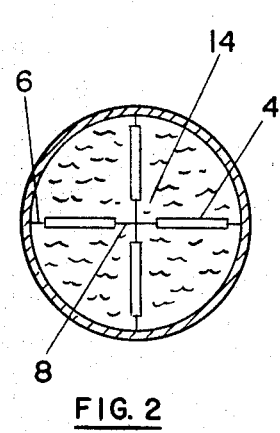
FIG. 2 is a horizontal cross section on the cutting line 2—2 of FIG. 1 showing top view of the set of four baffles.

As shown in both FIGS. 1 and 2, the baffles must be so positioned with respect to the reactor cross section so as to allow liquid to flow freely between the baffle edge and the reactor wall and also through, in and around the area 14 encased between the innermost edges of the baffles.

Figure 3:
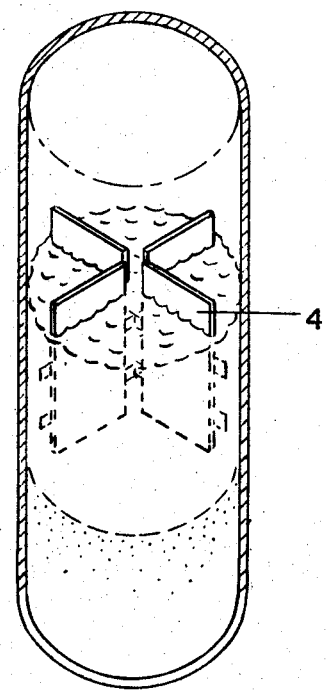
FIG. 3 is a cutaway perspective view of a set of four baffles.

FIG. 3 shows in perspective, the relationship of the baffles to one another and to the reaction vessel walls.

It is recognized, of course, that there are a number of possible modifications of the preferred embodiment, e.g., varying shape of baffles, number of baffles, although applicants have found that 4 to 8 baffles are usually most practical, and methods of supporting the baffles in the reactor; however, we have found that the preferred embodiment to be the most efficient combination.

EXAMPLE I

With baffles

| | |
|---|---|
| Feed | Kuwait vacuum bottoms. |
| Temperature | 818° F. |
| Pressure | 2400 p.s.i.g. |
| Space velocity | 0.4 $V_f$/hr./$V_r$. |
| Hydrogen pressure | 2200 p.s.i.g. |
| Hydrogen rate | 13,000 s.c.f./bbl. |
| Yields (wt. percent): | |
| $C_4$–400° F. | 13.9. |
| 400–680° F. | 23.1. |
| 680–975° F. | 29.0. |
| 975° F.+ | |
| Hydrogen in waste gas [1] | 530 s.c.f./bbl. |

[1] Without baffles—850 s.c.f./bbl.

Example I is a typical illustration of the significant improvement in hydrogen recovery that can be obtained with our invention. As shown, a decrease of 30% in the hydrogen content of the waste gas was achieved by using the described baffle system. This recovered hydrogen was recycled back to the reactor without recompression.

Thus, applicant has found that by passing the reacted liquid in such a process, across baffles as described above and after the liquid has passed through the catalytic agent, but prior to separation of the liquid and vaporous effluents, a significant decrease in the amount of hydrogen lost as a result of entrainment in the liquid can be realized.

While we have shown a preferred form of embodiment of our invention, we are aware that modifications within the scope and spirit of our invention will occur to those skilled in the art, and such modifications are contemplated to be within the scope of the claims appended hereinafter.

We claim:

1. The combination with a high pressure reaction vessel adapted for hydrogenation of liquid hydrocarbons wherein the reaction takes place in the presence of contact particles and wherein the reaction vessel has means to withdraw both vaporous and liquid effluents therefrom and wherein the contacting process taking place within the reaction vessel is that which is known as ebullated so that an interface exists between a lower portion of high catalyst density and an upper portion of low catalyst density, the improvement for minimizing hydrogen entrainment in the liquid product which comprises:
    (a) baffles, composed of material able to withstand hydrocarbon hydrogenation conditions and being inert with respect to the reactions taking place and having two or more sides with a large surface area and at least one side with a small surface area and having a vertical length of at least 0.3 the reaction vessel diameter and a horizontal width of not greater than 0.4 of the reaction vessel diameter;
    (b) means to firmly support the baffles within the reaction vessel and in a symmetrical mode about the vertical axis of the reaction vessel so that the baffles do not contact each other and do not contact the inside wall of the reaction vessel;
    (c) said baffles extending at least partially above the vapor-liquid interface.

2. A combination as claimed in claim 1, wherein the baffles are in the shape of rectangular sheets.

3. A combination as claimed in claim 1, wherein the surfaces of the baffles are corrugated so as to achieve greater surface area.

4. A combination as claimed in claim 1, wherein at least 4 and no more than 8 baffles are used in a single reactor.

5. In combination with a process for the hydrogenation of liquid hydrocarbons of the type wherein the liquid hydrocarbon is passed upwardly with hydrogen at high temperatures and pressures through a particulate catalytic agent in a reaction vessel at such velocity to place the catalytic agent in random motion in the liquid and create an interface above which the catalyst density is very low and below which the catalyst density is quite high and such that the catalyst is retained in the reaction vessel, wherein the contacting process taking place within the reaction vessel is that which is known as ebullated, which produces both liquid and vaporous effluents and which further comprises removing both vaporous and liquid effluents separately from the reaction vessel; the improvement for minimizing hydrogen entrainment in the liquid product which comprises passing the reacted liquid across baffles after the liquid has passed through the catalytic agent, but prior to separation of the vaporous and liquid effluents, the baffles being composed of material able to withstand hydrocarbon hydrogenation conditions and being inert with respect to the reactions taking place in the process and having two or more sides with large surface area and at least one side with a small surface area and having a vertical length of at least 0.3 the rection vessel diameter and a horizontal average width of not greater than 0.4 of the reaction vessel diameter and being firmly supported in a symmetrical mode about the vertical axis of the reaction vessel such that they do not contact each other and do not contact the inside wall of the reaction vessel, said baffles extending at least partially above the vapor-liquid interface.

References Cited

UNITED STATES PATENTS

| | | | |
|---|---|---|---|
| 1,992,133 | 2/1935 | Tarte | 196—46 |
| 2,728,632 | 12/1955 | Matheson | 23—288 X |
| 3,100,693 | 8/1963 | Klein et al. | 23—288 X |
| 3,235,342 | 2/1966 | Weber | 23—285 |

FOREIGN PATENTS 860,630  2/1961  Great Britain.

JOSEPH SCOVRONEK, Primary Examiner

U.S. Cl. X.R.

23—285, 288; 55—36, 159; 208—157